US010957182B2

(12) United States Patent
Judice et al.

(10) Patent No.: US 10,957,182 B2
(45) Date of Patent: Mar. 23, 2021

(54) NETWORK MONITORING AND CONTROL OF DATA LOGGING APPARATUS

(71) Applicant: Cole-Parmer Instrument Company LLC, Vernon Hills, IL (US)

(72) Inventors: Aaron Paul Judice, Houston, TX (US); Russell Martin De Pina, Houston, TX (US)

(73) Assignee: COLE-PARMER INSTRUMENT COMPANY LLC, Vernon Hills, IL (US)

( * ) Notice: Subject to any disclaimer, the term of this patent is extended or adjusted under 35 U.S.C. 154(b) by 0 days.

(21) Appl. No.: 16/426,875

(22) Filed: May 30, 2019

(65) Prior Publication Data
US 2019/0371157 A1 Dec. 5, 2019

Related U.S. Application Data

(60) Provisional application No. 62/678,010, filed on May 30, 2018.

(51) Int. Cl.
G08B 23/00 (2006.01)
G08B 21/20 (2006.01)

(52) U.S. Cl.
CPC ............. *G08B 23/00* (2013.01); *G08B 21/20* (2013.01)

(58) Field of Classification Search
CPC ............................... G08B 23/00; G08B 21/20
USPC ........................................................ 340/501
See application file for complete search history.

(56) References Cited

U.S. PATENT DOCUMENTS

| 9,342,082 | B2 * | 5/2016 | Guenette | G05D 23/1917 |
| 9,791,871 | B1 * | 10/2017 | Marschalkowski | G05D 23/1902 |
| 2007/0176766 | A1 * | 8/2007 | Cheng | G08B 17/10 340/527 |
| 2008/0215727 | A1 * | 9/2008 | Denis | H04L 43/0817 709/224 |

(Continued)

FOREIGN PATENT DOCUMENTS

EP 2 642 436 A1 9/2013

OTHER PUBLICATIONS

Honeywell RTH5100B, 2004 (Year: 2004).*
European Patent Application issued in related European patent application dated Sep. 26, 2019.

*Primary Examiner* — Zhen Y Wu
(74) *Attorney, Agent, or Firm* — Arent Fox LLP

(57) ABSTRACT

Aspects of the present disclosure provide for an environmental monitoring device including at least one environmental sensor configured to periodically measure at least one property of a surrounding environment. Such environmental monitoring device may be associated with other devices or items, such as medical device assets (e.g., products; installations) that may have multiple parameter monitoring needs associated therewith, and such devices may move, for example, with such assets (e.g., during transportation) to enable continuous monitoring and assessment of the associated assets. The environmental monitoring device may be configured to receive a logging interval and an alarm rang, control the at least one environmental sensor to record the measured property according to the logging interval, generate an alarm signal in response to the measured property being outside of the alarm, and send the record of the at least one measured property and any alarm signals to a remote server.

18 Claims, 12 Drawing Sheets

(56) References Cited

U.S. PATENT DOCUMENTS

| | | | |
|---|---|---|---|
| 2009/0309742 A1* | 12/2009 | Alexander | G08B 27/006 340/601 |
| 2010/0017210 A1* | 1/2010 | Blaker | G10L 15/08 704/251 |
| 2011/0015802 A1* | 1/2011 | Imes | G05D 23/1923 700/300 |
| 2012/0280814 A1 | 11/2012 | Beale et al. | |
| 2013/0198245 A1* | 8/2013 | Kagan | G01D 4/004 707/812 |
| 2013/0317659 A1* | 11/2013 | Thomas | H02J 4/00 700/286 |
| 2014/0137024 A1* | 5/2014 | Curtis | G06F 3/14 715/771 |
| 2015/0084784 A1 | 3/2015 | Suta et al. | |
| 2015/0148965 A1* | 5/2015 | Lemire | G05B 19/048 700/276 |
| 2015/0358218 A1* | 12/2015 | Nasir | H04L 41/0803 709/224 |
| 2016/0132046 A1* | 5/2016 | Beoughter | G05B 19/4184 700/17 |
| 2016/0363143 A1* | 12/2016 | Druce | H02G 3/10 |
| 2017/0289824 A1* | 10/2017 | Figoli | H04W 76/15 |
| 2018/0068556 A1* | 3/2018 | Meah | G08B 29/145 |
| 2018/0129232 A1* | 5/2018 | Hriljac | F24F 11/56 |
| 2018/0271417 A1* | 9/2018 | Pathangay | A61B 5/14532 |
| 2018/0338675 A1* | 11/2018 | Eggli | A61B 1/00055 |
| 2018/0373399 A1* | 12/2018 | Battula | H04W 4/70 |
| 2019/0285305 A1* | 9/2019 | Kunnathully Jayakumar | F24F 11/64 |
| 2019/0296982 A1* | 9/2019 | Clark | H04L 41/22 |
| 2019/0310667 A1* | 10/2019 | Brown | G08B 21/10 |
| 2019/0360713 A1* | 11/2019 | Sheppick | F24F 11/56 |

* cited by examiner

660

9:20 AM      77 %

←     Reports

Trip
Fullwithalarms

Report Format
☐ PDF    ☑ CSV    ☐ Secured PDF

Types of Reports
☑ Summary    ☐ Alarm Events
☐ Graph    ☐ Data Detal

Email To
aj@control3.com

Send

FIG. 9

NETWORK MONITORING AND CONTROL OF DATA LOGGING APPARATUS

CLAIM OF PRIORITY UNDER 35 U.S.C. § 119

This application claims priority to U.S. Provisional Application No. 62/678,010 titled "NETWORK MONITORING AND CONTROL OF DATA LOGGING APPARATUS," filed May 30, 2018, which is assigned to the assignee hereof, and incorporated herein by reference in its entirety.

INTRODUCTION

Aspects of the present disclosure generally relate to environment monitoring devices and systems for controlling such devices.

BACKGROUND

Environment monitoring devices may measure and log one or more parameters of an environment, such as temperature or humidity. The environment monitoring device may store logged data temporarily until the logged data is uploaded to a local device, such as a computer. Conventional environment monitoring devices may not scale well to large operations. Typically, the monitoring device is controlled via a local user interface or possibly controlled remotely via a local wireless network interface. Although data may be exported by the environment monitoring device, the user is typically responsible for managing the exported data.

Accordingly, there is a need for environment monitoring devices and systems and methods of control thereof that provide scalable management of multiple devices.

SUMMARY

The following presents a simplified summary of one or more aspects of the present disclosure in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In an aspect, the present disclosure provides for an environmental monitoring device including at least one environmental sensor configured to periodically measure at least one property of a surrounding environment. Such environmental monitoring devices may be associated with other devices or items, such as medical device assets (e.g., products; installations) that may have multiple parameter monitoring needs associated therewith, and such devices may move, for example, with such assets (e.g., during transportation) to enable continuous monitoring and assessment of the associated assets. The environmental monitoring device may include a memory, a network interface, and a processor in communication with the memory and the network interface. The processor may be configured to receive, via a network connection, a configuration including a logging interval and an alarm range. The processor may be configured to control the at least one environmental sensor to record the at least one measured property according to the logging interval. The processor may be configured to generate an alarm signal in response to the at least one measured property being outside of the alarm range defined by the configuration. The processor may be configured to send the record of the at least one measured property and any alarm signals to a remote server via the network interface.

In another aspect, the disclosure provides a system for monitoring environmental conditions of an asset. The system may include one or more environmental monitoring devices each including least one environmental sensor configured to periodically measure at least one property of a surrounding environment and generate an alarm in response to the at least one property satisfying a threshold. The environmental monitoring device is located proximate the asset. The system may include a user device that wirelessly communicates with the at least one environmental monitoring device to provide a user selected configuration to the environmental monitoring device and receive a trip record including a record of the at least one periodically measured property. The system may include at least one server configured to receive the trip record and associate the trip record with a record of the asset.

In another aspect, the disclosure provides a method of operating an environmental monitoring device including at least one environmental sensor. The method may include receiving, via a network connection, a configuration including a logging interval and an alarm range. The method may include controlling the at least one environmental sensor to record the at least one measured property according to the logging interval. The method may include generating an alarm signal in response to the at least one measured property being outside of the alarm range defined by the configuration. The method may include sending a record of the at least one measured property and any alarm signals to a remote server via the network interface.

These and other aspects of the present disclosure will become more fully understood upon a review of the detailed description, which follows.

BRIEF DESCRIPTION OF THE DRAWINGS

FIG. 9 is a diagram of an example user interface for reporting monitored data, according to an aspect of the disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

In an aspect, the disclosure provides for an environmental monitoring device that logs environmental data. For example, the environmental data may relate to process or storage conditions for an asset in a laboratory or warehouse or during transit. The environmental monitoring device may be attached to or packaged with the asset to monitor the conditions experienced by the asset. The environmental monitoring device may be controlled via a local user interface or via an application executed by a mobile device. The mobile device may communicate with the environmental logging device via a local wireless communication channel such as Bluetooth or wireless local area network (WLAN). Additionally, aspects of the disclosure provide for a network application (also interchangeably referred to herein as an "interface") that coordinates information regarding multiple environmental monitoring devices. The network application may receive logged data from the environmental monitoring devices and associate the logged data to one or more devices, customers, or assets.

Figure 1:
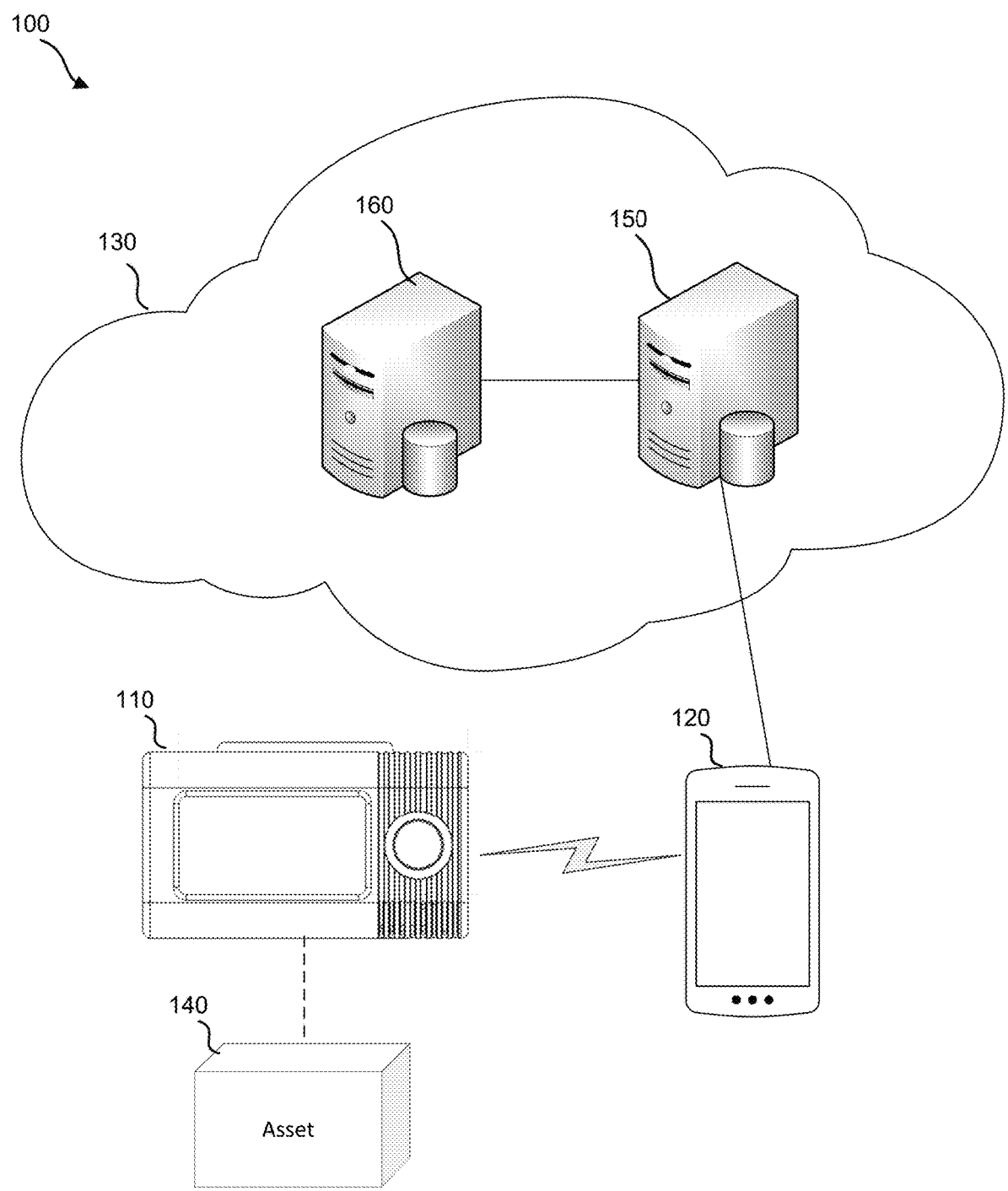
FIG. 1 is schematic diagram of an example network environment for an environment monitoring device, according to an aspect of the disclosure.

FIG. 1 is a representative schematic diagram of an example network environment 100 for an environmental monitoring device 110, in accordance with aspects of the present disclosure. The network environment 100 may include a user device 120 for providing a user interface to a user, a communication network 130 for transmitting various communications among devices as described herein, an application server 150 for providing an application to the user device 120 and/or a server 160 for storing data reported by one or more environmental monitoring devices 110 and user devices 120. Additionally, an environmental monitoring device 110 may be linked to an asset 140, and the user device 120 and application server 150 may track the asset 140 (see further discussion of assets in conjunction with FIG. 3 below).

The environmental monitoring device 110 may be or include an environmental monitoring device having sensor hardware for monitoring an environment and communications hardware (e.g., network interface) and software described herein for providing remote control and monitoring of the environmental monitoring device 110, among other features. In an aspect, the environmental monitoring device 110 may operate in either a local mode, for example, in which a local user interface is used to control operation of the environmental monitoring device 110, or a remote mode in which commands received via a network interface are used to control operation of the environmental monitoring device 110.

The term "environmental monitoring device" as used herein describes a category electronic device that collects environmental data over a period of time. An environmental monitoring device may include one or more sensors or detecting various environmental parameters such as temperature, humidity, barometric pressure, and carbon dioxide level.

The user device 120 may include various computing devices that may be used to access an application via, for example, a web interface. For example, the user device 120 may be or include any mobile or fixed computer device including but not limited to a desktop or laptop or tablet computer, a cellular telephone, a gaming device, a mixed reality or virtual reality device, a music device, a television, a navigation system, a camera, a personal digital assistant (PDA), a handheld device, any other computer device having a processor and wired and/or wireless connection capability for use with one or more other devices. The user device 120 may include a processor that executes an operating system and one or more applications. In an aspect, the user device 120 may execute a dedicated application for providing a user interface to the environmental monitoring device control application server 150. In another aspect, the user device 120 may execute a web browser application to access a webpage providing a user interface to the environmental monitoring device control application server 150. In an aspect, the user device 120 may be configured for secure communication with the application server 150. For example, the user device 120 may install a certificate of the application server 150 allowing device verification and encrypted communications.

The communication network 130 may be a computer network that allows communication between various devices. For example, the communication network 130 may include the Internet and may transmit data packets according to the Internet protocol. As illustrated, the communication network 130 may include the application server 150. In an aspect, the application server 150 may be implemented using a cloud architecture. For example, the application server 150 may be implemented as a virtual server to be provided by a cloud services provider. The cloud service provider may generate instances of the virtual server using geographically dispersed computing hardware. A cloud architecture may provide scalability, load balancing, stability against network interruptions, and redundancy of stored data, among other features. It should be appreciated that the application server 150 may also be implemented using conventional computer servers configured to execute the programs described herein.

Application server 150 may include one or more computer servers configured to provide a user interface accessible via a user device 120. The application server 150 may communicate with dedicated applications executing on user devices 120 or may provide a web-based interface accessible via a web browser, for example. As described in further detail below, in one or more example implementations, the user interface provided by the application server may allow a user to configure one or more environmental monitoring devices 110 for operation. The application server 150 may also perform monitoring of the environmental monitoring devices 110 and provide alerts to the user devices 120. The user interface may allow the user device 120 to configure which alerts to receive and how the alerts are received (e.g., via application notification, text, or email).

The application server 150 may be coupled to or include a database or other data repository server 160 (such server 160 also being interchangeably referred to herein as a "database server") to store information collected from one or more environmental monitoring devices 110. The database server 160 may, for example, provide data security and integrity protection. In an aspect, the database server 160 may collect and store data that may be reported to regulatory agencies, for example, as evidence of laboratory processes or conditions. The database server 160 may provide data security using secure socket layer (SSL) certificates to encrypt data between the environmental monitoring devices 110 and the database server 160. Additionally, access to the database server 160, as well as the application server 150, may be controlled using authenticated user names and passwords. Actions on any of the servers may be attributed to a specific user. The database server 160 may generate an audit trail indicating which users performed actions at which time. Further, because the environmental monitoring devices 110 may be operated in either local mode or remote mode, the database server 160 may track actions taken in local mode even if a registered user is not identified. That is, the actions performed in local mode may be attributable to a local user.

The database server 160 may segregate data of multiple customers. That is, a customer (e.g., a laboratory, corporation, or other entity), may have access only to data associated with devices belonging to that customer. A customer may designate multiple registered users (e.g., employees), for example, who may access data based on user role. For example, the database server 160 may allow access to users based on a security level. For instance, a system administrator may be able to configure database storage, export data, annotate data, and generate audit reports, while a non-administrator level user may only be able to read or export data. Additionally, a system administrator may not be associated with any customer and may at least read any data.

Figure 2:
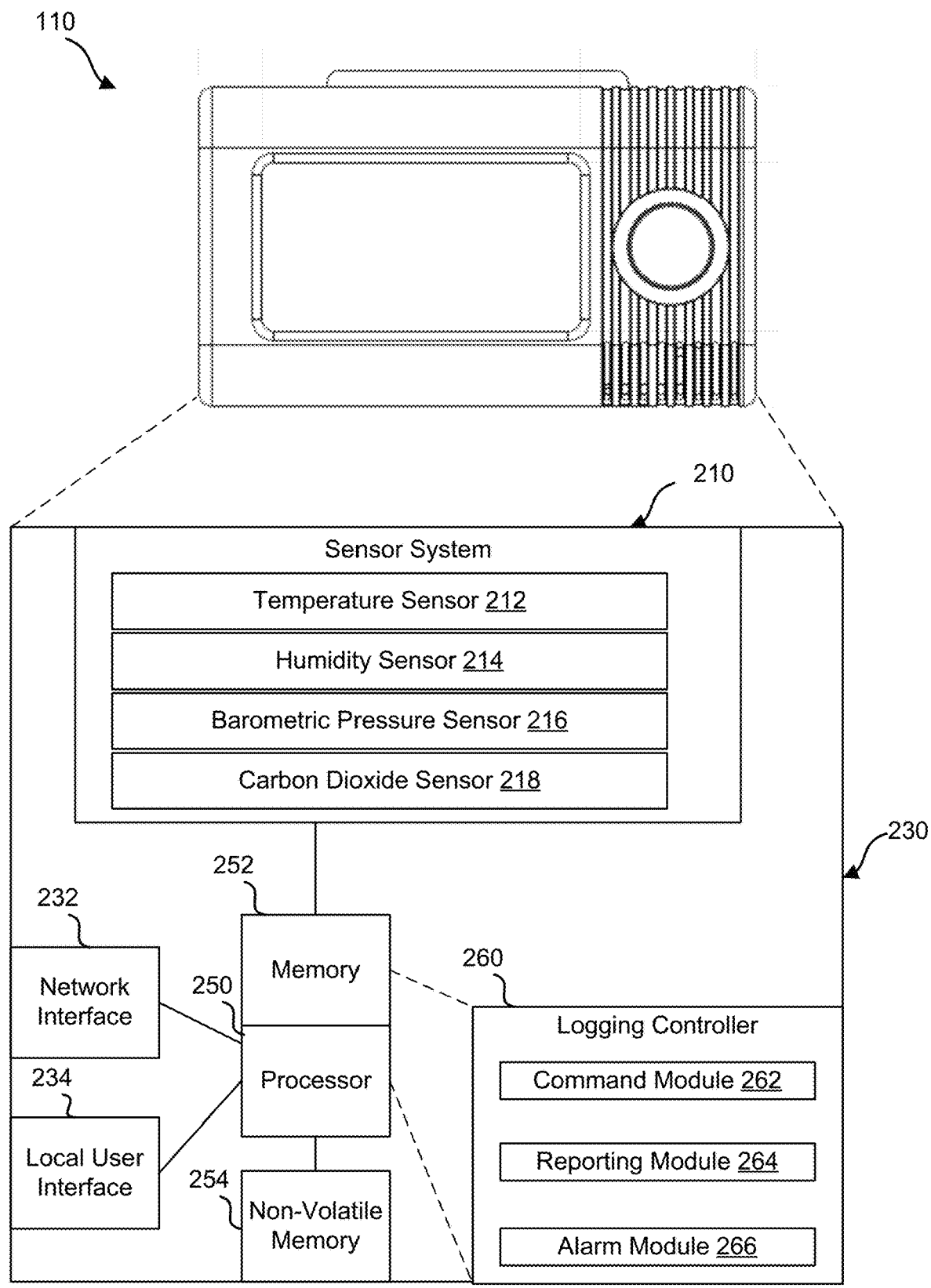
FIG. 2 is schematic diagram of an example environment monitoring device, according to an aspect of the disclosure.

FIG. 2 is a representative schematic diagram showing various features of an example environmental monitoring device 110 usable in accordance with aspects of the present disclosure. The environmental monitoring device 110 may include a sensor system 210 and a case 220. The case 220 may include one or more openings 224 to expose certain components of the sensor system 210 to an external environment. For example, the openings 224 may be located in one corner of the case 220 closest to a sensor component of the sensor system 210.

The sensor system 210 may include one or more sensors or other components for detecting environmental parameters. For example, the sensor system 210 may include a temperature sensor 212 (thermometer), a humidity sensor 214 (hygrometer), a barometric pressure sensor 216 (barometer), and/or a carbon dioxide sensor 218. Each sensor may monitor a respective parameter and generate a signal indicating a current value of the parameter. In an aspect, each sensor may be configured to generate a discrete measurement at a regular interval. For example, the sensor may take a single measurement and report a single value for storage. In another aspect, each sensor may continuously signal the current value, and the logging controller 260 may sample the signal at the regular interval.

The case 220 may house various electronic components of the environmental monitoring device 110. The case 220 may include a button 222 that controls one or more functions of the environmental monitoring device 110. For example, the button 222 may be a start/stop button that starts and/or stops a logging function. The case 220 may also include a mounting bracket 226. The mounting bracket 226 may be removably coupled to an asset 140, for example, via screws or other fasteners. The mounting bracket 226 may also be removably coupled to the case 220, for example, via an interference fit or locking mechanism. In another aspect, the case 220 may include magnets (not shown) for removably coupling the environmental monitoring device 110 to an asset 140.

The case 220 may include a display 256. The display 256 may be, for example, a monochromatic liquid crystal display, however, other displays known in the art may be used as well. The display 256 may present information regarding the environmental monitoring device 110 or the monitored environment. For example, the display 256 may include a current monitored parameter value 260, a minimum monitored parameter value 262, a maximum monitored parameter value 264, a total alarm time value 266, and a memory capacity meter 268.

Example electronic components located within the case 220 may include a network interface 232, a local user interface 234, a processor 250, a memory 252, and a non-volatile memory 254. Further, the memory 252 may store instructions executable by the processor 250 for implementing a logging controller 260, which may include a command module 262, a reporting module 264, and an alarm module 266, for example.

The network interface 232 may include a wired or wireless network interface for transmitting and receiving data packets, among other functions. In an aspect, the network interface 232, for example, may utilize TCP/IP packets that may carry commands, parameters, or data. For example, the network interface 232 may receive messages including the commands from the user device 120. The network interface 232 may forward commands to the processor 250 for processing by the command module 262. Conversely, the network interface 232 may receive data generated by the reporting module 264 or alarm module 266 from the processor 250 and transmit corresponding data to the application server 150 via the user device 120.

The local user interface 234 may include any suitable controls provided on the environmental monitoring device 110 for controlling the environmental monitoring device 110. In an aspect, the local user interface 234 may include a display screen that presents menus or other selection features for selecting configuration options similar to the configuration transmitted by the user device 120. In another aspect, the local user interface 234 may include dedicated buttons and/or other selection features that may be used to perform specific commands. For example, the local user interface 234 may include a button to start/stop data logging. The local user interface 234 may generate commands to the processor 250 for processing by the logging controller 260. As noted above, the environmental monitoring device 110 may operate in a remote mode in which the local user interface 234 is at least partially disabled to prevent local input.

The processor 250 may include one or more processors for executing instructions. An example of processor 250 may include, but is not limited to, any processor specially programmed as described herein, including a controller, microcontroller, application specific integrated circuit (ASIC), field programmable gate array (FPGA), system on chip (SoC), or other programmable logic or state machine. The processor 250 may include other processing components, such as an arithmetic logic unit (ALU), registers, and a control unit. The processor 250 may include multiple cores and may be able to process different sets of instructions and/or data concurrently using the multiple cores to execute multiple threads, for example.

Memory 252 may be configured for storing data and/or computer-executable instructions defining and/or associated with the logging controller 260, and processor 250 may execute such instructions with regard to operation of the logging controller 260. Memory 252 may represent one or more hardware memory devices accessible to processor 250. An example of memory 252 usable in accordance with aspects of the present disclosure may include, but is not limited to, a type of memory usable by a computer, such as random access memory (RAM), read only memory (ROM), tapes, magnetic discs, optical discs, volatile memory, non-volatile memory, and/or any combination thereof. Memory 252 may store local versions of a logging controller application being executed by processor 250, for example.

The logging controller 260 may control operation of the environmental monitoring device 110 based on commands received from either the network interface 232 or the local user interface 234. The logging controller 260 may include a command module 262 for controlling the sensor system 210 based on commands, a reporting module 264 for recording and reporting logs of environmental data, and/or an alarm module 266 for comparing environmental signals from the sensor system 210 to thresholds to detect alert conditions.

Figure 3:
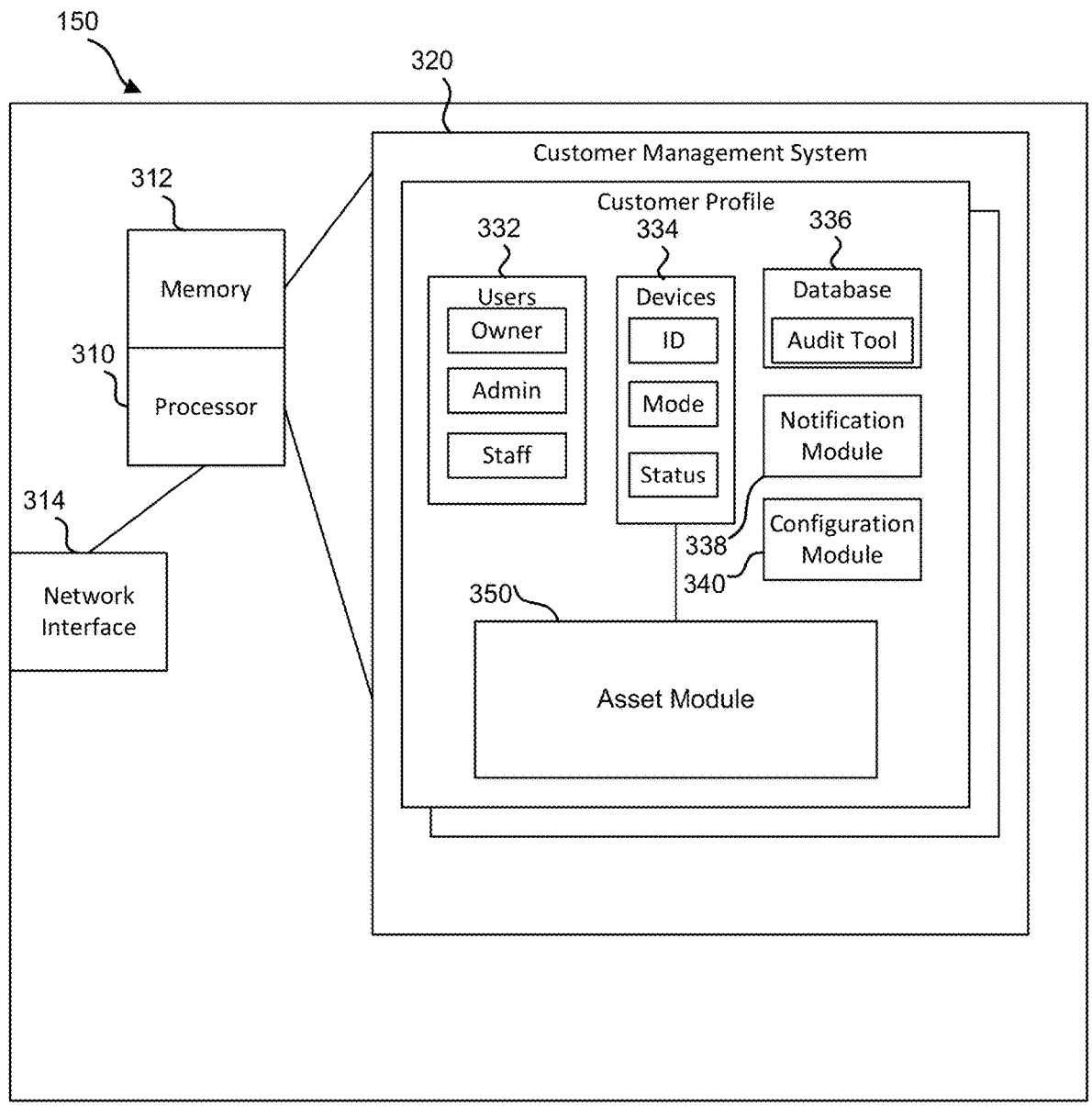
FIG. 3 is a schematic diagram of an example application server, according to an aspect of the disclosure.

FIG. 3 is a representative schematic diagram of an example application server 150 usable in accordance with aspects of the present disclosure. In an aspect, the application server 150 may provide a user interface to a user associated with a user device 120 for controlling, managing, or monitoring one or more environmental monitoring devices 110, which may for example, be selectively associated with the user. In an aspect, the application server may be designed to accommodate organizations that may purchase multiple environmental monitoring devices to be used by multiple users. The application server 150 may model such organizations as customers and thereby provide a customer management system 320 tailored so as to facilitate access control to the multiple environmental monitoring devices associated with each customer.

As noted above, the application server 150 may be implemented using a computer server or a virtual server implemented using cloud resources, for example. In either case, the application server may be implemented on computer hardware including, for example, a processor 310, memory 312, and network interface 314, each of which may have similar hardware components to those described above.

The customer management system 320 may define a customer profile 330 for each customer organization. The customer profile 330 may include a number of registered users 332, which may include an owner, administrator, and staff, for example. The owner may be an account owner that retains all access privileges for the customer. An administrator may have the ability to configure environmental monitoring devices and select programs for operating the devices. Staff may be limited to receiving alerts regarding environmental monitoring devices and obtaining data regarding the environmental monitoring devices or have only other limited permissions, for example.

The customer profile 330 may also include a number of environmental monitoring device profiles 334 associated with the customer. The customer may, for example, use a user device 120 to register each environmental monitoring device 110 and create a corresponding device profile 334. The device profile 334 may then be accessed by the users 332. The device profile may include one or more identifiers, a current control mode (e.g., remote or local), and a current status (e.g., on-off and/or current operation parameters), for example.

The customer profile 330 may also include a database module 336 that provides access to a database storing data collected from environmental monitoring devices 110. For example, the database module 336 may provide a user interface that allows a user 332 to generate various reports regarding the devices 110 or the associated device profiles 334. As another example, the database module 336 may include an audit tool that allows a user to create, review, inspect, etc. an audit trail for data in the database.

Among other things, the customer profile 330 may also include a notification module 338 that allows a customer to configure notifications or alerts to be received by users 332. The notification module 338 may allow a selection of an alert type (e.g., text, email, application notification) for each user, and selection or tailoring of one or more predefined alert conditions (e.g., corresponding to monitored alarm conditions for the environmental monitoring devices 110). For example, the notification module 338 may allow a user 332 to determine which monitored alarms should trigger notifications to one or more users 332.

The customer profile 330 may also include a configuration module 340 that allows a customer to configure an environmental monitoring device 110, for example. A configuration for an environmental monitoring device 110 may include, for example, a start mode, stop mode, memory mode, unit preference, alarm settings, and logging interval, as described in further detail below with respect to FIG. 4. The configuration module 340 may allow the user to select a predefined configuration for a device model and enter parameters for the predefined configuration. In an aspect, a user may upload a configuration to be included in the predefined configurations.

The customer management system 320 may also provide an asset module 350 for tracking assets 140 in association with environmental monitoring devices. An asset 140 may be one or more physical objects that may be associated with an environmental monitoring device 110. In one use case, for example, one or more pharmaceutical products may be packaged with an environmental monitoring device 110 prior to shipment. The asset module 350 may associate the pharmaceutical products with the environmental monitoring device. For example, the environmental monitoring device 110 or user device 120 may scan a tag (e.g., barcode, QR code, RFID tag, or NFC tag) of the product to obtain an identifier to associate with the environmental monitoring device 110. The identifier may also be manually input. The asset module 350 may associate any trip data for the environmental monitoring device 110 with the associated asset 140.

Figure 4:
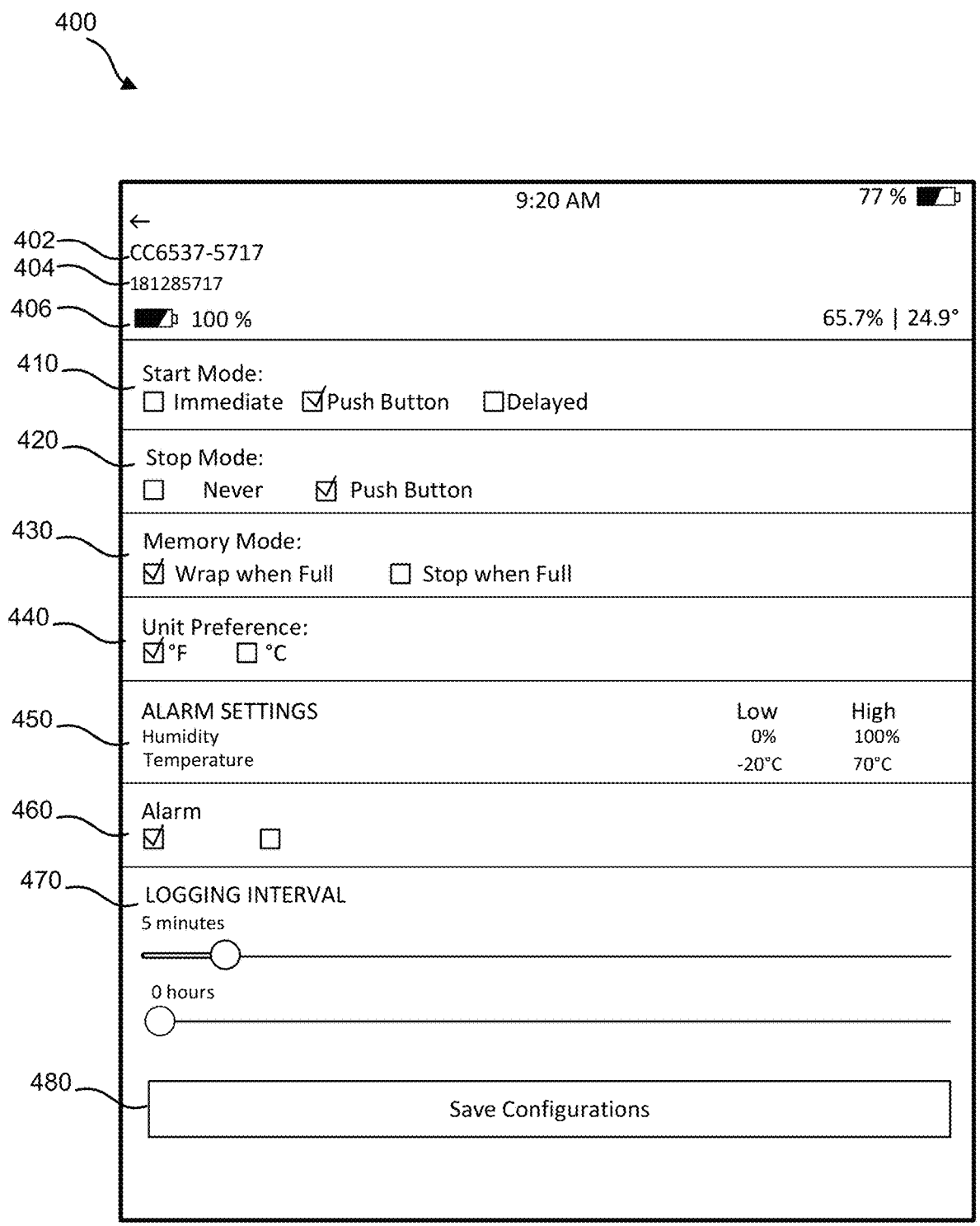
FIG. 4 is a diagram of an example user interface for an environment monitoring device control application, according to an aspect of the disclosure.

FIG. 4 shows representative screen elements of an example user interface 400 for a monitoring device control application usable in accordance with various features of the present disclosure that may be executed by a user device 120. The user interface 400 may present configuration options for an environmental monitoring device 110. The user interface 400 may include a device name 402, a device serial number 404, and a device power level 406. The user interface may include selection options for start mode 410 including immediate (e.g., remote start), push button, and delayed. The user interface 400 may include selection options for stop mode including never (e.g., remote control only) and push button. The user interface 400 may include selection options for memory mode 430 including wrap when full and stop when full. The user interface 400 may include selection options for unit preference 440, which may depend on the parameters that the monitoring device measures, for example. The user interface 400 may include alarm settings 450 for each measurement channel, including a minimum value and a maximum value. For example, an alarm may be generated when the measured channel is not between the minimum value and the maximum value. A selectable alarm enable option 460 may enable or disable the alarms. The user interface 400 may include a logging interval 470 that may be selectively adjustable in hours or minutes. The user interface 400 may include a save button 480 to save the selected options and configure the environmental monitoring device 110.

Figure 5:
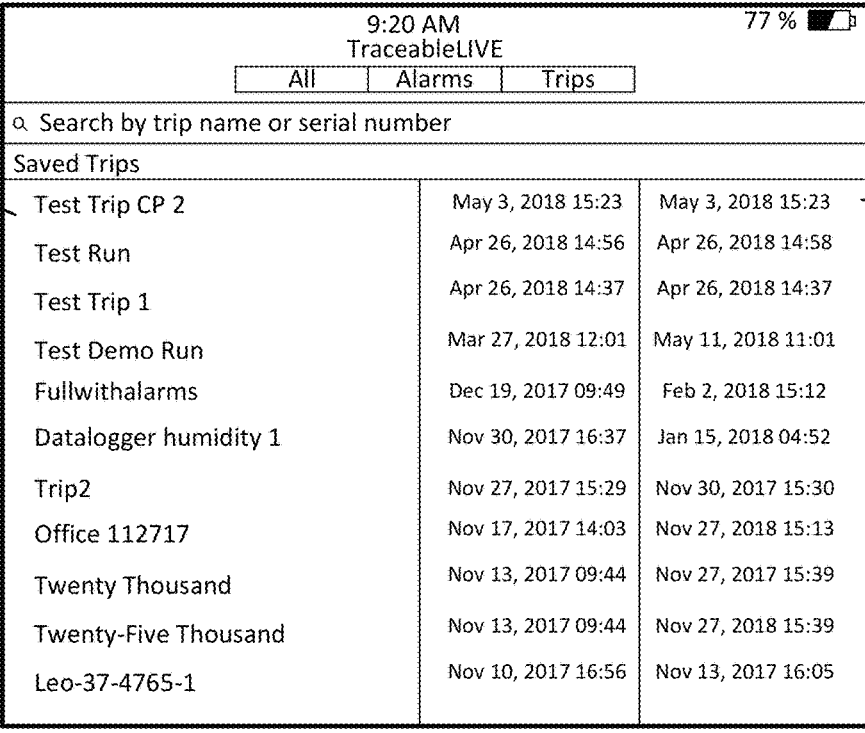
FIG. 5 is a diagram of an example user interface for managing environmental monitoring device data at a server, according to an aspect of the disclosure.

FIG. 5 shows a representative view of an example screen of a user interface 500 for a data management application usable in accordance with various aspects of the present disclosure that may be executed by a user device 120 or displayed via a web application by the application server 150. The application server 150 may receive data for a trip from the environmental monitoring device 110 via the user device 120, for example. A trip may include all data logged between a start time and a stop time of the environmental monitoring device 110, as well as the configuration information for the data logging. The user interface 500 may include a name 510 for each trip as well as start and stop times 520. When a user selects a trip name 510, the user interface 500 may present a user interface for the trip.

Figure 6:
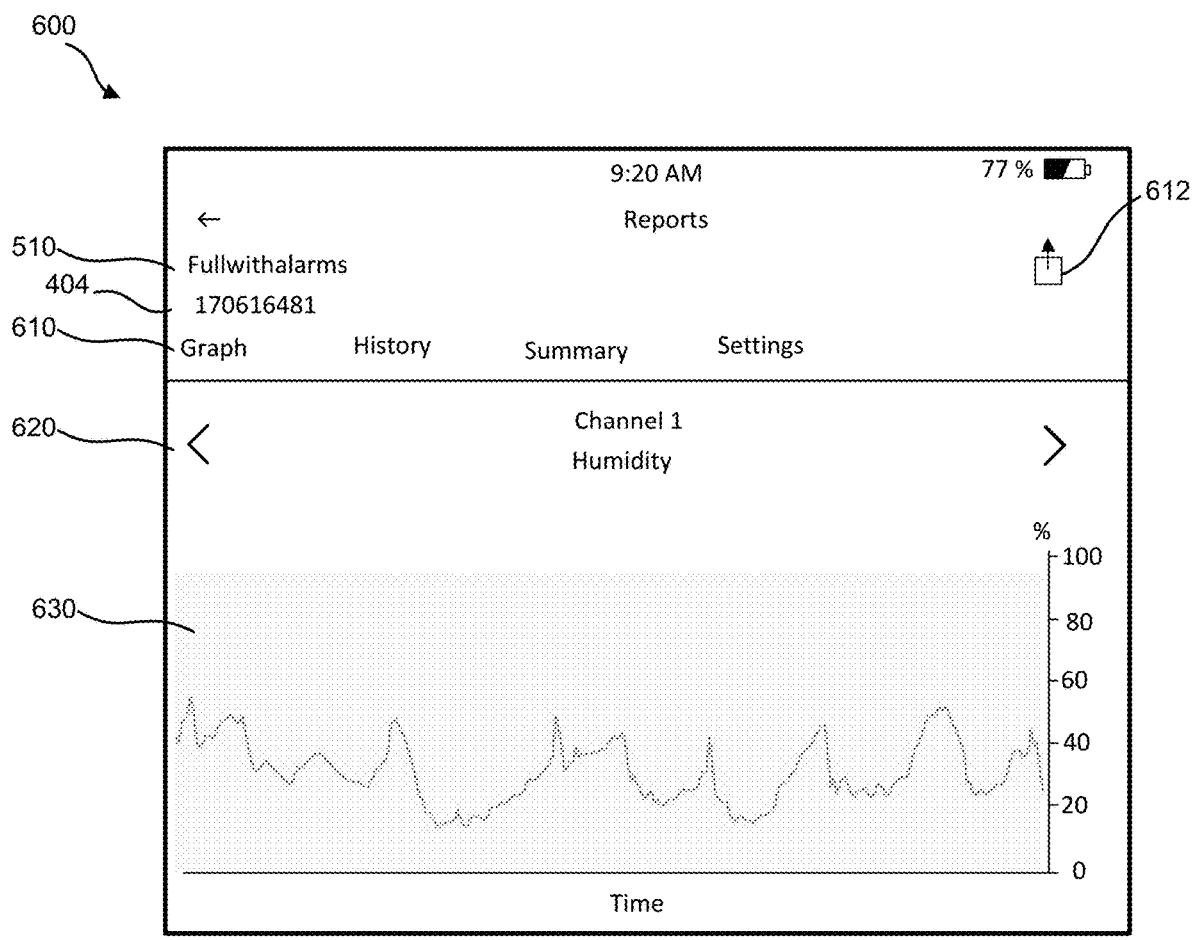
FIG. 6 is a diagram of an example user interface for presenting a graph view of monitored data, according to an aspect of the disclosure.

FIG. 6 illustrates a view of an example user interface screen 600 showing information for a trip. In an aspect, for example, the trip may involve movement of the environmental monitoring device 110 of FIG. 1. The user interface 600 may include trip name 510 and the device serial number 404. Other identification information may also be displayed. The user interface 600 may include navigation options 610 that selectively display different views, including graph, history, summary, and settings, for example. The user interface 600 may also include a reporting option 612. The illustrated view of the user interface 600 may show an example screen when the graph option is selected. The user interface 600 may include a channel selection option 620 that allows a user to select among different channels for each measured parameter. The user interface 600 may then display a graph 630 for the selected parameter. For example, the graph may show time on the independent axis and the measured parameter on the dependent axis, and the user may vary aspects of how the data is presented.

Figure 7:
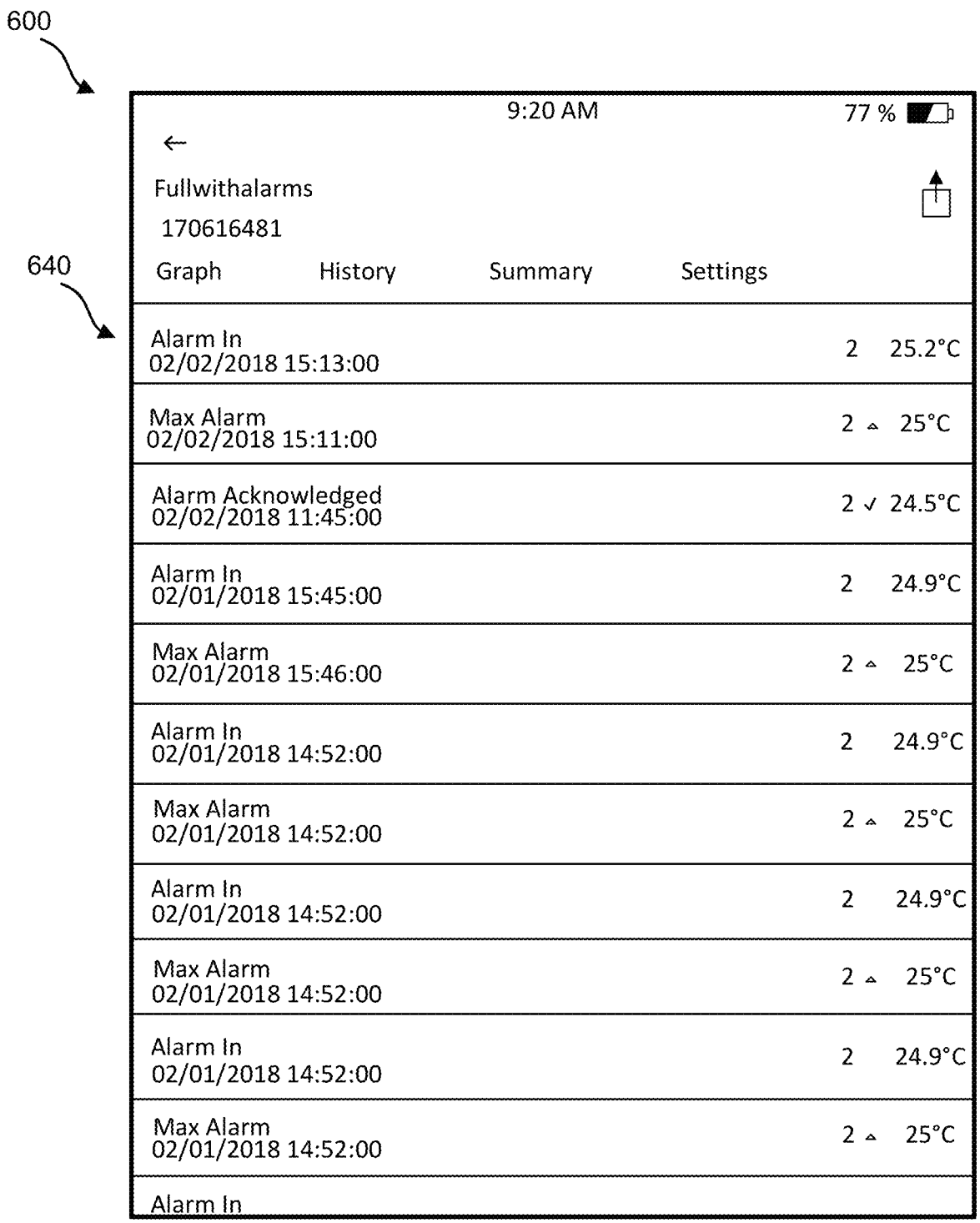
FIG. 7 is a diagram of an example user interface for presenting an alarm view of monitored data, according to an aspect of the disclosure.

FIG. 7 illustrates the example user interface 600 displaying a history view 640 screen when the history option is selected from the navigation options 610. The history view 640 may include events related to the configured alarms. For example, the events may include a time when the alarm was triggered, a time when an extreme value (e.g., maximum or minimum) was reached on the measured parameter, and any user acknowledgments of the alarm.

Figure 8:
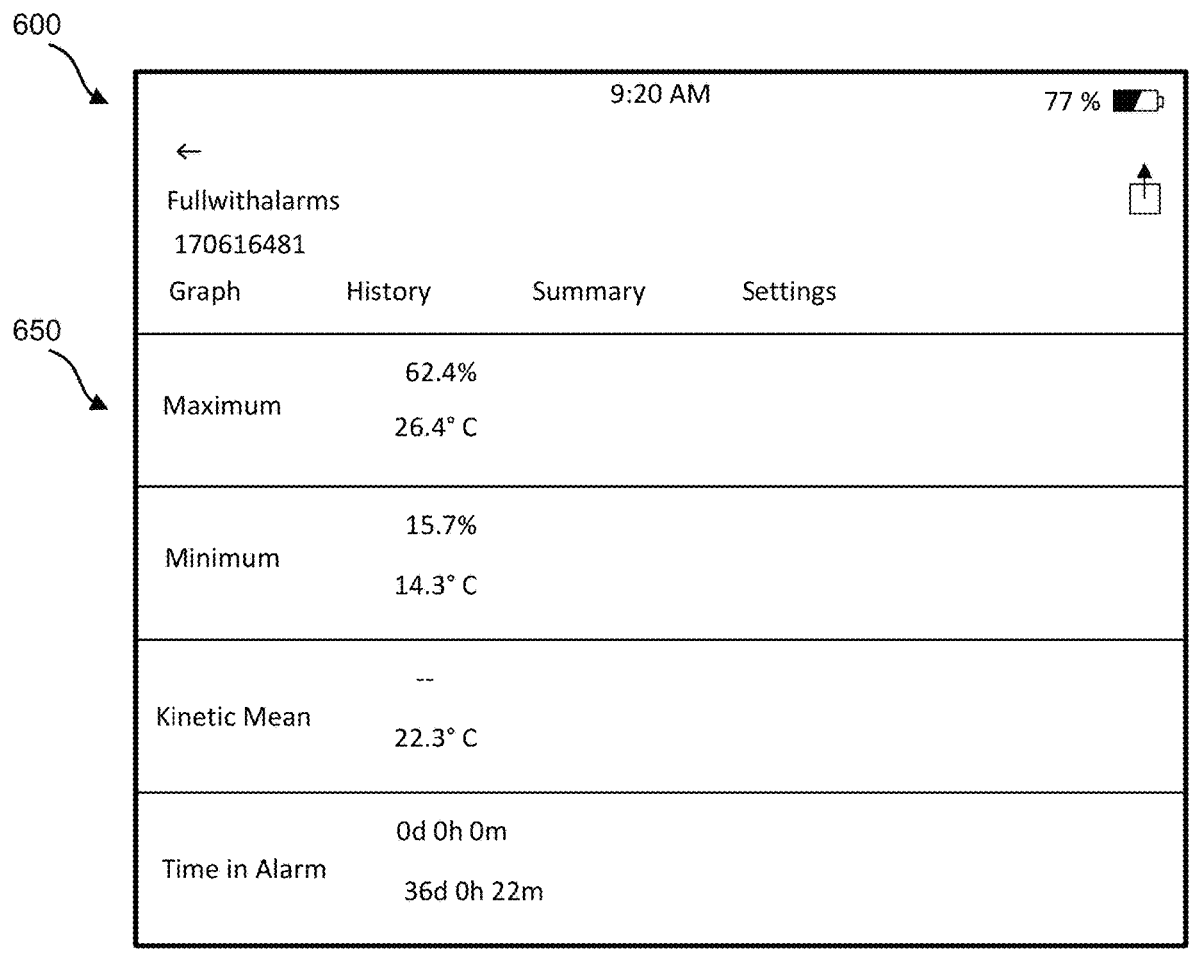
FIG. 8 is a diagram of an example user interface for presenting a summary view of monitored data, according to an aspect of the disclosure.

FIG. 8 illustrates the example user interface 600 displaying another screen with a summary view 650, which may be displayed in response to a user selecting the summary option from the navigation options 610. The summary view 650 shown in FIG. 8 may include maximum values for each channel, minimum values for each channel, a kinetic mean for each channel, and a total alarm time for each channel Additionally, a settings view (not shown) of the user interface 600 may display any of the settings configured on the user interface 400 when the setting option of the navigation options 610 is selected.

FIG. 9 illustrates another example user screen showing reporting options 660 that may displayed in response to a user selecting the reporting option button 612 of FIG. 6. The reporting user options screen 660 may allow a user to select a report format, type of report, and email address, for example. The report format may include, for example, portable document format (PDF), secured PDF, comma separated value (CSV), or other compatible file formats. The types of reports may include a summary report, alarm events report, graph, or data detail. Multiple reports may be selected and features associated with the application server 150 (FIG. 1) may be used to enable combination of the selected reports into a single file, for example.

Figure 10:
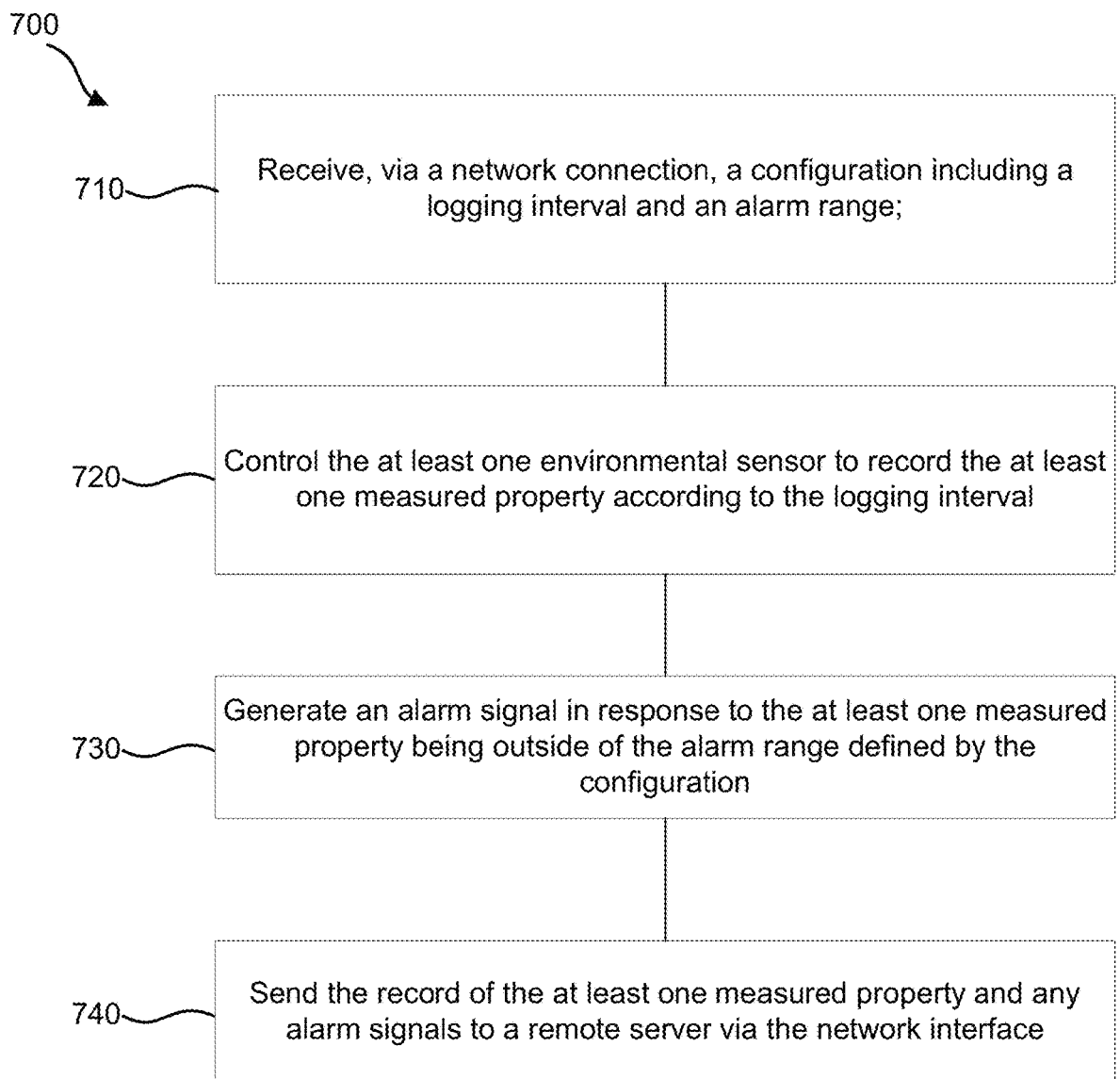
FIG. 10 is a flow diagram showing an example method of operation of an environment monitoring device, according to an aspect of the disclosure.

FIG. 10 is a flow diagram showing an example method 700 of operating an environmental monitoring device 110, in accordance with aspects of the present disclosure. The method 700 may be performed via the environmental monitoring device 110 of FIG. 1, for example, which may also optionally be operated in conjunction with a user interface on a user device 120 (FIG. 1).

In block 710, the method 700 may include receiving, via a network connection, a configuration including a logging interval and an alarm range. In an aspect, for example, the environmental monitoring device 110 (FIG. 1) may receive, via the network interface 232, a configuration including a logging interval and an alarm range. For example, the configuration may be generated via the user interface 400 (FIG. 4).

In block 720, the method 700 may include controlling the at least one environmental sensor to record the at least one measured property according to the logging interval. In an aspect, for example, the environmental monitoring device 110 may operate the command module 262 (FIG. 2) to control the at least one environmental sensor to record the at least one measured property according to the logging interval.

In block 730, the method 700 may include generating an alarm signal in response to the at least one measured property being outside of the alarm range defined by the configuration. In an aspect, for example, the environmental monitoring device 110 may operate the alarm module 266 to generate an alarm signal in response to the at least one measured property being outside of the alarm range defined by the configuration.

In block 740, the method 700 may include sending the record of the at least one measured property and any alarm signals to a remote server via the network interface. In an aspect, for example, the environmental monitoring device 110 may operate the reporting module 264 (FIG. 2) to send the record of the at least one measured property and any alarm signals to the remote server (e.g., database server 160) via the network interface 314.

Figure 11:
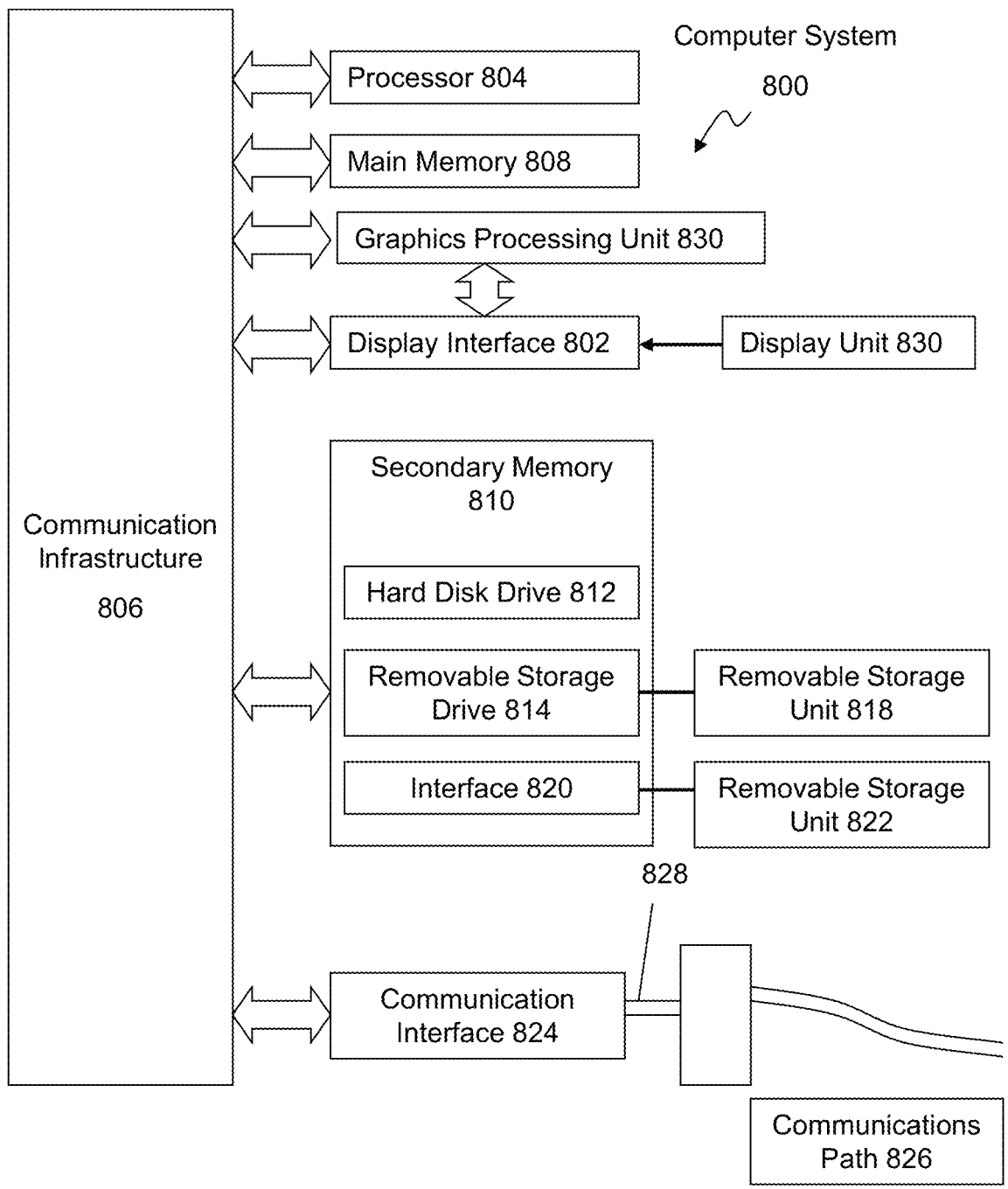
FIG. 11 presents an exemplary system diagram of various hardware components and other features, for use in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 11 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one example variation, aspects of the disclosure are directed toward one or more computer systems capable of carrying out the functionality described herein. An example of such a computer system 800 is shown in FIG. 11.

Computer system 800 includes one or more processors, such as processor 804. The processor 804 is connected to a communication infrastructure 806 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 800 may include a display interface 802 that forwards graphics, text, and other data from the communication infrastructure 806 (or from a frame buffer not shown) for display on a display unit 830. Computer system 800 also includes a main memory 808, preferably random access memory (RAM), and may also include a secondary memory 810. The secondary memory 810 may include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well-known manner. Removable storage unit 818, represents a floppy disk, magnetic tape, optical disk, etc., which is read by and written to removable storage drive 814. As will be appreciated, the removable storage unit 818 includes a computer usable storage medium having stored therein computer software and/or data.

In alternative aspects, secondary memory 810 may include other similar devices for allowing computer programs or other instructions to be loaded into computer system 800. Such devices may include, for example, a removable storage unit 822 and an interface 820. Examples of such may include a program cartridge and cartridge interface (such as that found in video game devices), a removable memory chip (such as an erasable programmable read only memory (EPROM), or programmable read only memory (PROM)) and associated socket, and other removable storage units 822 and interfaces 820, which allow software and data to be transferred from the removable storage unit 822 to computer system 800.

Computer system 800 may also include a communications interface 824. Communications interface 824 allows software and data to be transferred between computer system 800 and external devices. Examples of communications interface 824 may include a modem, a network interface (such as an Ethernet card), a communications port, a Personal Computer Memory Card International Association (PCMCIA) slot and card, etc. Software and data transferred via communications interface 824 are in the form of signals 828, which may be electronic, electromagnetic, optical or other signals capable of being received by communications interface 824. These signals 828 are provided to communications interface 824 via a communications path (e.g., channel) 826. This path 826 carries signals 828 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 880, a hard disk installed in hard disk drive 870, and signals 828. These computer program products provide software to the computer system 800. Aspects of the disclosure are directed to such computer program products.

Computer programs (also referred to as computer control logic) are stored in main memory 808 and/or secondary memory 810. Computer programs may also be received via communications interface 824. Such computer programs, when executed, enable the computer system 800 to perform various features in accordance with aspects of the present disclosure, as discussed herein. In particular, the computer programs, when executed, enable the processor 804 to perform such features. Accordingly, such computer programs represent controllers of the computer system 800.

In variations where aspects of the disclosure are implemented using software, the software may be stored in a computer program product and loaded into computer system 800 using removable storage drive 814, hard disk drive 812, or communications interface 820. The control logic (software), when executed by the processor 804, causes the processor 804 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 12:
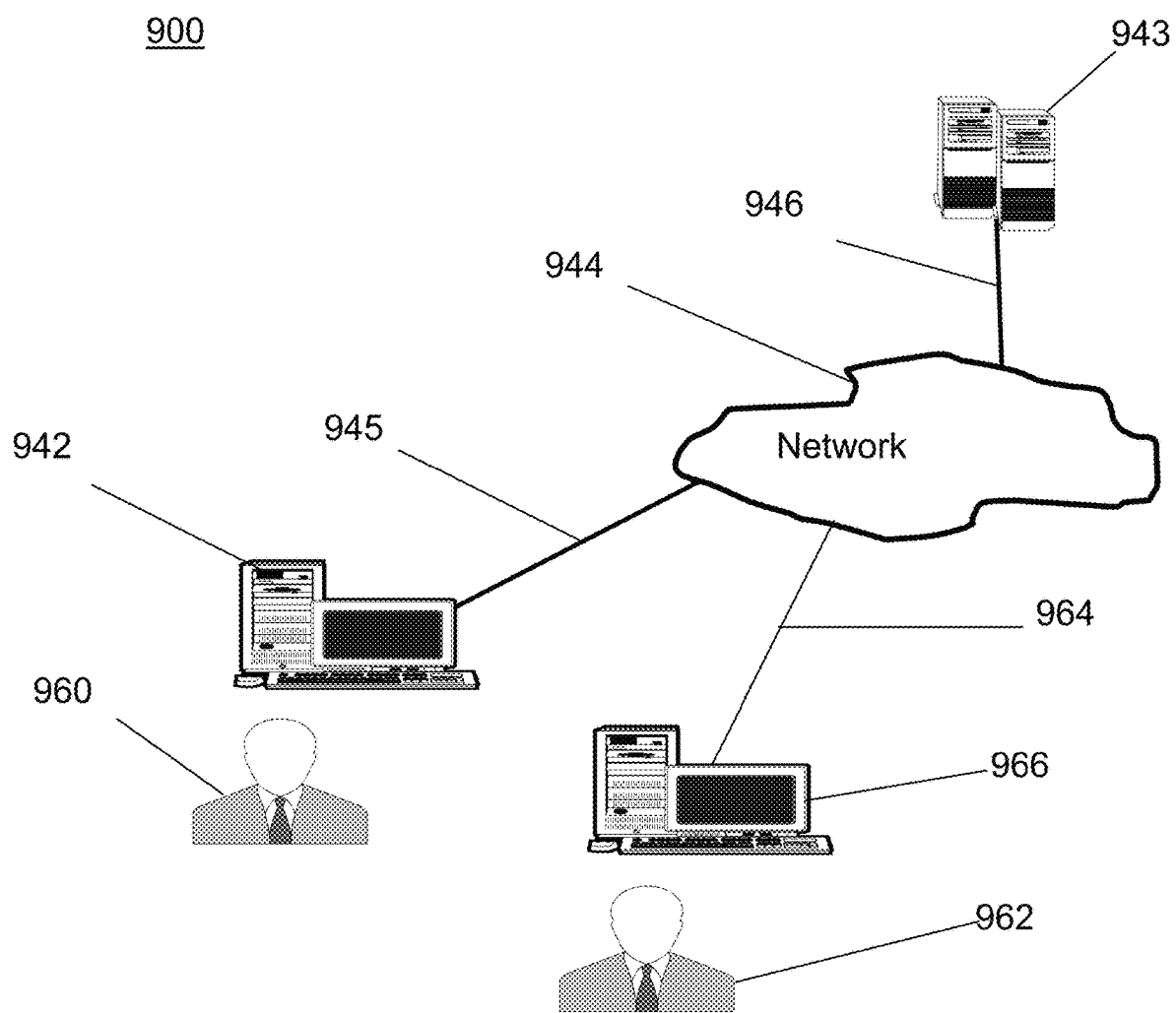
FIG. 12 is a block diagram of various exemplary system components, for use in accordance with aspects of the present disclosure.

FIG. 12 is a block diagram of various example system components (e.g., on a network) that may be used in accordance with aspects of the present disclosure. The system 900 may include one or more accessors 960, 962 (also referred to interchangeably herein as one or more "users") and one or more terminals 942, 966. The accessors 960, 962 may correspond to user devices 120 (FIG. 1). In one aspect, data for use in accordance with aspects of the present disclosure may, for example, be input and/or accessed by accessors 960, 962 via terminals 942, 966, such as personal computers (PCs), minicomputers, mainframe computers, microcomputers, telephonic devices, or wireless devices, such as personal digital assistants ("PDAs") or a hand-held wireless devices coupled to a server 943, such as a PC, minicomputer, mainframe computer, microcomputer, or other device having a processor and a repository for data and/or connection to a repository for data, via, for example, a network 944, such as the Internet or an intranet, and couplings 945, 946, 964. The couplings 945, 946, 964 include, for example, wired, wireless, or fiber optic links. In another example variation, the method and system in accordance with aspects of the present disclosure operate in a stand-alone environment, such as on a single terminal.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

This written description uses examples to disclose aspects of the present disclosure, including the preferred embodiments, and also to enable any person skilled in the art to practice the aspects thereof, including making and using any devices or systems and performing any incorporated methods. The patentable scope of these aspects is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. An environmental monitoring device, comprising: at least one environmental sensor configured to periodically measure at least one property of a surrounding environment;
a memory;
a network interface;
a local user interface configured to receive a selection of configuration options, wherein the local user interface includes at least one physical button; and
a processor in communication with the memory and the network interface, the processor configured to:
receive, via a network connection, a configuration including a logging interval and an alarm range;
place the environmental monitoring device in a remote mode in which the local user interface is at least partially disabled to prevent local input by the at least one physical button;
control the at least one environmental sensor to record the at least one measured property according to the logging interval;
generate an alarm signal in response to the at least one measured property being outside of the alarm range defined by the configuration; and
send the record of the at least one measured property and the alarm signal to a remote server via the network interface.

2. The environmental monitoring device of claim 1, wherein the environmental sensor is one of a temperature sensor, a humidity sensor, a barometric pressure sensor, or a carbon dioxide sensor.

3. The environmental monitoring device of claim 1, further comprising a case including one or more openings that expose the environmental sensor to an external environment.

4. The environmental monitoring device of claim 3, wherein the case includes a mounting bracket that removably couples the environmental monitoring device to an asset.

5. The environmental monitoring device of claim 1, further comprising a display configured to access the memory to present a current monitored parameter value, a minimum monitored parameter value, a maximum monitored parameter value, a total alarm time value, and a memory capacity meter.

6. A system for monitoring environmental conditions of an asset, comprising:
one or more environmental monitoring devices each including at least one environmental sensor configured to periodically measure at least one property of a surrounding environment and generate an alarm in response to the at least one property satisfying a threshold and a local user interface configured to receive a selection of configuration options, wherein the local user interface includes at least one physical button, the environmental monitoring device located proximate the asset;
a user device that wirelessly communicates with the at least one environmental monitoring device to provide a user selected configuration to the environmental monitoring device and receive a trip record including a record of the at least one periodically measured property, wherein the user device is configured to place the at least one environmental monitoring device in a remote mode in which the local user interface is at least partially disabled to prevent local input by the at least one physical button; and
at least one server configured to receive the trip record and associate the trip record with a record of the asset.

7. The system of claim 6, wherein the at least one server includes an application server that hosts an application accessible via the user device, wherein the application server monitors the environmental monitoring device and provides an alert to the user device based on the alarm.

8. The system of claim 7, wherein the application includes a user interface that allows the user to select alert conditions defining which alerts to receive and to select how the alerts are received.

9. The system of claim 6, wherein the at least one server includes a database server that stores the trip record in association with the record of the asset.

10. The system of claim 9, wherein the database server:
limits access to the environmental monitoring device and the records to one or more registered users; and
associates an action with respect to the environmental monitoring device or the records with one of the registered users.

11. The system of claim 10, wherein the database server generates an audit trail including all actions associated with the environmental monitoring device or the asset and the registered user that performed the action.

12. The system of claim 10, wherein data transmitted between the one or more environmental monitoring devices and the database server are encrypted.

13. The system of claim 6, wherein the user device includes a graphical user interface to view the trip record, the graphical user interface including a graph of the at least one property.

14. The system of claim 6, wherein the user device includes a graphical user interface to configure the user selected configuration, the graphical user interface including an option to select a logging interval and an alarm range.

15. The system of claim 14, wherein the graphical user interface includes an option to stop recording data when an internal memory is full or to overwrite data when the internal memory is full.

16. A method of operating an environmental monitoring device including at least one environmental sensor, comprising:
receiving, via a network connection, a configuration including a logging interval and an alarm range;
placing the at least one environmental monitoring device in a remote mode in which a local user interface of the environmental monitoring device is at least partially disabled to prevent local input by at least one physical button;
controlling the at least one environmental sensor to record at least one measured property according to the logging interval;
generating an alarm signal in response to the at least one measured property being outside of the alarm range defined by the configuration; and
sending a record of the at least one measured property and the alarm signal to a remote server via a network interface.

17. The method of claim 16, further comprising receiving a signal to start or stop recording the at least one measured property from a physical button on the environmental monitoring device.

18. The method of claim 16, wherein sending the record of the at least one measured property and any alarm signals to the remote server via the network interface comprises sending the record to a user device via a local wireless communication channel.

\* \* \* \* \*